No. 660,385. Patented Oct. 23, 1900.
A. J. MADDEN.
SELF WINDING ELECTRIC CLOCK.
(Application filed Dec. 23, 1899.)
(No Model.) 4 Sheets—Sheet 1.
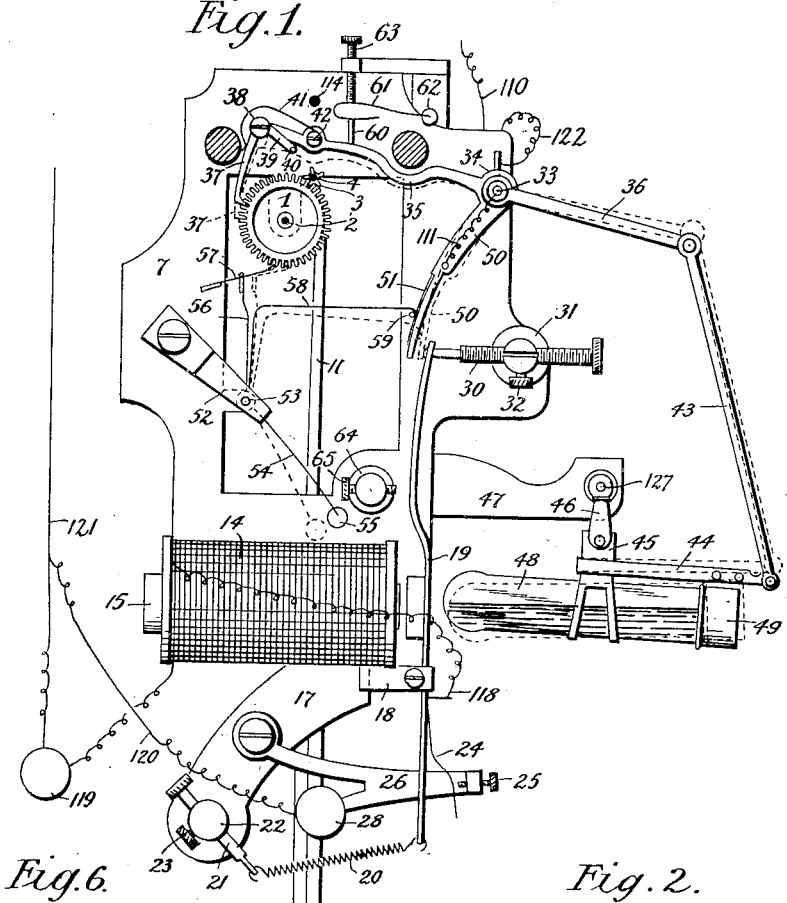
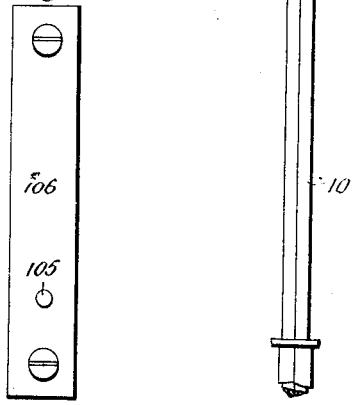
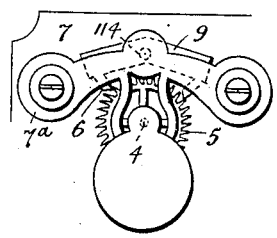
Witnesses:
E. Holloway
H. C. Pinckney
Inventor:
Augustine John Madden
By J. E. W. Bowen
Attorney
THE NORRIS PETERS CO., PHOTO-LITHO., WASHINGTON, D. C.

No. 660,385. Patented Oct. 23, 1900.
A. J. MADDEN.
SELF WINDING ELECTRIC CLOCK.
(Application filed Dec. 23, 1899.)
(No Model.) 4 Sheets—Sheet 2.

Witnesses:
E. Holloway
W. C. Pinckney

Inventor:
Augustine John Madden
By J. E. M. Bowen
Attorney

THE NORRIS PETERS CO., PHOTO-LITHO., WASHINGTON, D. C.

No. 660,385. Patented Oct. 23, 1900.
A. J. MADDEN.
SELF WINDING ELECTRIC CLOCK.
(Application filed Dec. 23, 1899.)
(No Model.) 4 Sheets—Sheet 3.
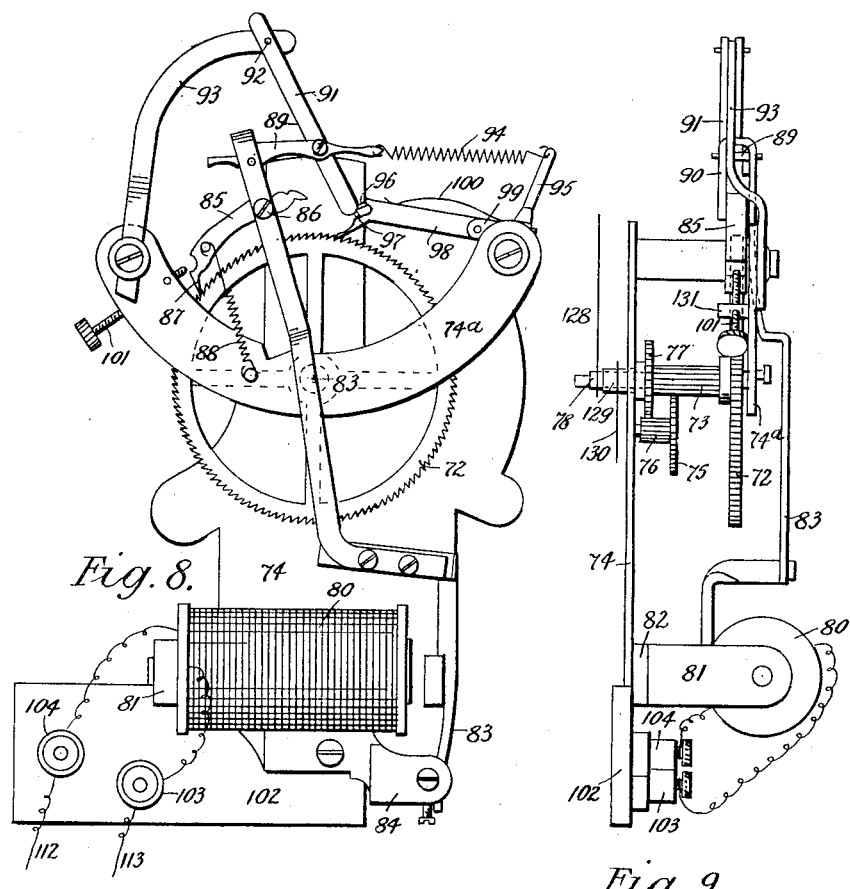
Fig. 8.
Fig. 9.
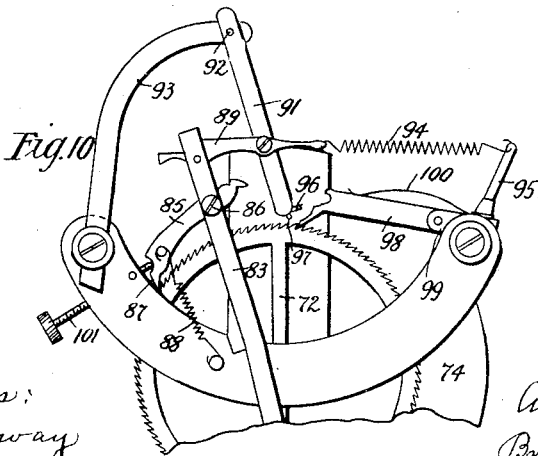
Fig. 10.
Witnesses:
C. Holloway
M. C. Pinckney
Inventor:
Augustine John Madden
By J. E. W. Bowen
Attorney No. 660,385. Patented Oct. 23, 1900.
A. J. MADDEN.
SELF WINDING ELECTRIC CLOCK.
(Application filed Dec. 23, 1899.)
(No Model.) 4 Sheets—Sheet 4.

Witnesses:
W. C. Pinckney
C. Holloway

Inventor:
Augustine John Madden,
By J S M Bowen
Attorney.

THE NORRIS PETERS CO., PHOTO-LITHO., WASHINGTON, D. C.

UNITED STATES PATENT OFFICE.

AUGUSTINE JOHN MADDEN, OF PRAHRAN, VICTORIA.

SELF-WINDING ELECTRIC CLOCK.

SPECIFICATION forming part of Letters Patent No. 660,385, dated October 23, 1900.

Application filed December 23, 1899. Serial No. 741,422. (No model.)

*To all whom it may concern:*

Be it known that I, AUGUSTINE JOHN MADDEN, a subject of the Queen of Great Britain, residing at No. 41 Murray street, Prahran, in the Colony of Victoria, have invented certain new and useful Improvements in Electrical Synchronizing Clocks, of which the following is a specification.

This invention has been devised to provide improvements in the construction of electrical controlling-clocks and dials controlled thereby.

My invention consists of two parts: first, the initiatory controlling mechanism or master-clock, and, second, other mechanisms or time-indicators, forming a series in circuit with the first mechanism and with each other or separately from one another in connection with the first mechanism.

In order to make the invention clear, I will now refer to the accompanying drawings, in which—

Figure 3:
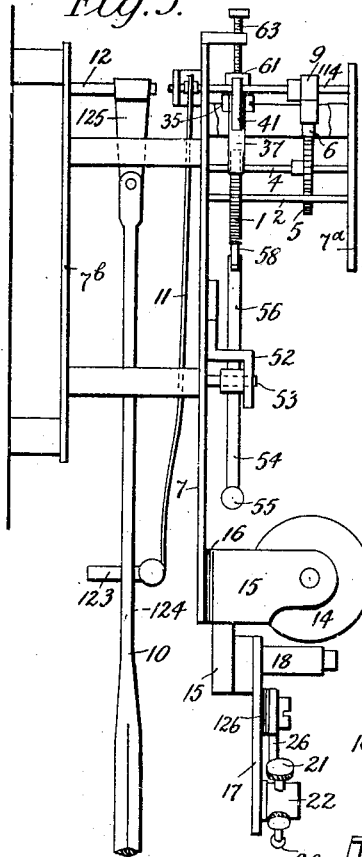
Figure 4:
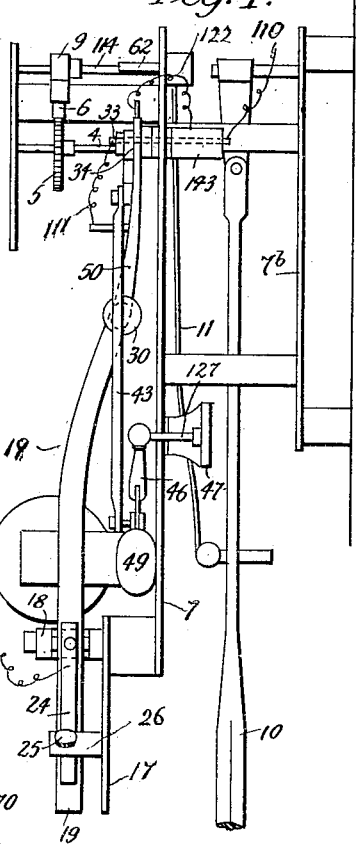
Figure 7:
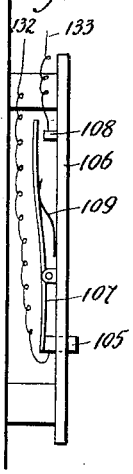
Figure 5:
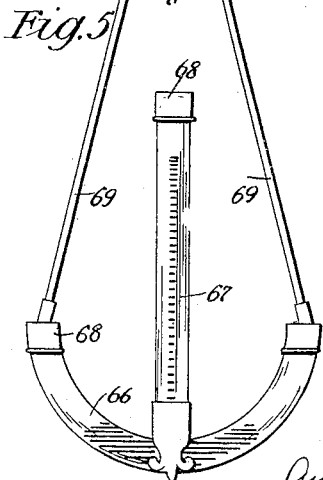
Figure 13:
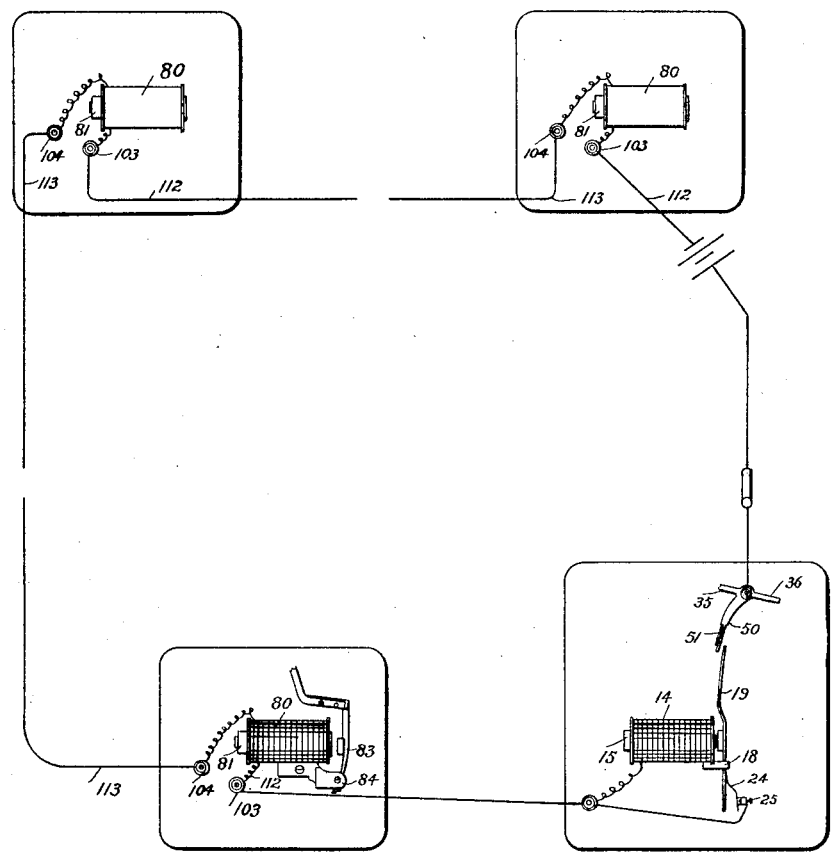
Figure 11:
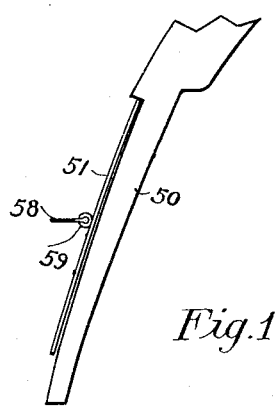
Figure 12:
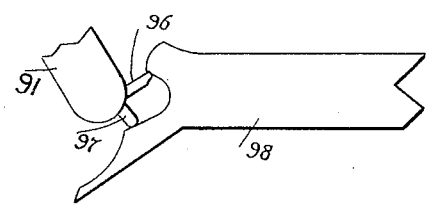

Figure 1 shows a front elevation of the master-clock with the escapement mechanism removed. Fig. 2 shows front elevation of the escapement mechanism. Fig. 3 shows a view at left-hand side of the mechanism illustrated in Fig. 1; Fig. 4, a view at right-hand side of the mechanism illustrated in Fig. 1. Fig. 5 shows a pendulum, drawn to half the scale of Fig. 1, employed with the mechanism of Fig. 1. Fig. 6 shows front elevation of short-circuit mechanism for operating the dial of clocks independently of the master-clock. Fig. 7 is a side view of same. Fig. 8 shows back elevation of a secondary or dial clock to be controlled by the master-clock. Fig. 9 is a view taken at left-hand side of the same; Fig. 10, a part view corresponding with Fig. 8, but with the parts in their altered position. Figs. 11 and 12 are enlarged views of details, and Fig. 13 is a diagrammatic view.

I will now proceed to describe the mechanism illustrated upon Figs. 1 to 5 and constituting the master-clock. 1 represents main toothed wheel having any given number of teeth and arranged to rotate on plain staff or spindle 2, which has suitable bearings in frame-plates 7 7ª. Said wheel gears with the pinion 3 on the staff or spindle 4, which carries escape-wheel 5 of ordinary construction, (either dead-beat or otherwise.) The said escape-wheel is operated on by pallets 6 6 on block 9, suitably constructed to suit the teeth of the escape-wheel, as in ordinary clocks. The anchor and pallets are carried by staff 114, which latter carries also crutch 11 and which imparts the impulse (given by the escape-wheel teeth's action on the pallets) to the pendulum by pin 123, which passes through slot 124 in pendulum-rod 10. The pendulum-rod is suspended by the flexible suspension-spring 125 from pin 12, fixed in frame-plate in the usual manner.

An electromagnet 14 (which may be in duplicate) is fixed to frame-plate 7 by plate 15, an insulating-strip 16 being interposed between the plate 15 and frame-plate 7. To the plate 15 is secured an arm 17, which carries an arm 18, recessed to receive the armature 19, which is hinged in the said arm and extends downwardly beyond same, its lower end being connected by a spring 20 to pin 21, which passes through a hole in stud 22, affixed to the arm 17, and is adjustably secured in position by said screw 23. The lower portion of the armature carries flat curved spring 24. A screw-pin 25 is arranged so as to contact with same on the inward movement of the armature. The pin 25 is supported by arm 26, which is secured to arm 17 and insulated therefrom by strip 126. A binding-post 28 is carried by the arm 26. The armature extends upwardly, as shown in Fig. 1, and near its termination a screw-pin 30 is set in an insulated stud 31, affixed to frame-plate 7, the pin being thus adjustable and arranged to bear against armature near its end to limit its outward movement. A locking-pin 32 may be provided to bear upon the screw. At the upper portion of the clock-frame an insulated stud 33 is fixed, which carries lever 34, arranged to work loosely on it. This lever has an upwardly-inclined arm 35, which carries at its end a pawl 37, working loosely on a pivot or screw 38 and arranged to engage with the toothed wheel 1. The pawl has an arm 39, which carries a pin 40, which latter projects beneath the arm 35 and forms a limiting-stop to prevent pawl entering too far between the teeth of the wheel 1. A spring 41 is secured upon the arm 35 by a screw 42 (or otherwise) and bears upon the pawl 37, so as to cause the pawl when moved up (with the arm 35) to engage with the teeth on the wheel 1. The other arm 36 of the lever 34 (which is illustrated as a separate piece affixed at the center) has attached at its end a connecting rod or link 43, working loose on a pivot screw or joint. The other end of the connecting rod or link descends and is articulated to a pivoted mercury-containing tube or frame connected therewith. In the illustration I have shown the rod 43 pivoted to arm 44, supported by frame 45, suspended by a link 46 from pin 127, set in arm 47, which latter is insulated and projected from frame-plate 7 of clock. The frame 45 is looped and receives the tube 48, which rests in a horizontal position. This tube is preferably constructed of glass and contains mercury, the end being closed by a cap 49. The quantity of mercury should be such as to about half fill the tube. The sectional form of the tube is preferably as indicated on Fig. 4, which form is found to facilitate rapid displacement of the mercury. The tube is elliptical or elongated oval in cross-section with the major axis vertical, and the inner end is enlarged and of globular form. The tube should be set with a slightly-greater length from center of its bearing to inside end of tube than to outer end.

The lever 34 has a depending arm 50 attached to it at its center, said arm being arranged to make and break contact with the armature, as hereinafter described. The face of the said arm 50 has a spring-plate 51 attached.

The frame-plate 7 has a plate 52 attached. A small staff is pivoted at 53 between the said plates. A flexible arm 54 descends from the staff and carries at its end a small weight 55. Another small spring-arm 56 extends upwardly from the staff 53 and carries at its end a pivoted pawl-lever 57, weighted at one end. Its click engages with the teeth on the wheel 1 and follows same up by means of the descending weight. Another arm 58 extends from the staff 53 and terminates in a rounded end or a roller 59. This arm extends to (or nearly to) the arm 50 of the lever aforesaid and moves downwardly with it, Figs. 1 and 11.

The arm 35 of the lever 34 has an upwardly-projecting pin 60 attached to it. Upon same a flat spring 61 (secured to pin 62, projecting from the frame) bears. An adjustable screw-pin 63 is arranged to press upon the spring. 64 represents an insulated stud which is secured to the frame-plate and has a screw-pin 65, which forms a limitation-stop for the armature.

The pendulum which I employ is constructed in such a way that an impulse is obtained at the bottom at about the time the impulse is supplied at the top by the pallets striking the escape-wheel and is constructed as follows, (see Fig. 5:) A curved or semicircular tube 66 (circular in section) is provided and has a straight tube connected at its center and set vertically, but not having internal communication with it, the ends of the tubes being closed by means of caps 68 68. To the caps at the ends of the semicircular tube I attach rods 69, which are set in an adjustable frame 70, through which the pendulum-rod 10 passes, the whole of the parts just described being adjustable along the pendulum-rod by means of the screw-cap 71, set upon the screw end of rod 10.

I would have it understood that in some cases I might, in lieu of a pendulum-escapement, employ a lever-cylinder or other suitable escapement for the master or initiatory movement—for example, where there is excessive vibration, on trains, shipboard, and like places.

The toothed wheel 1 may have attached a ratchet-wheel, if desired, and the pawls 37 and 57 be arranged to operate on it in lieu of upon the toothed wheel, as illustrated.

At the connecting-point between the arm 50 and the armature I employ plumbago, pipe-clay, or the like substance, through which the platinum tip on the arm passes and minimizes the amount of corrosion of the platinum tip due to the electric spark.

The electrical circuit is from the battery or source of electrical supply by the conducting-wire 110, stud 33, wire 111, arm 50, armature 19, wire 118, electromagnet 14, terminal 119, and by wire 121 back to battery. The wire 122 forms a secondary passage or shunt for the current from the sleeve 143 (which communicates with stud 33) to the arm 50. By employing this secondary conductor I insure the passage of current when circuit is completed. On the armature being attracted to the electromagnet the spring 24 will come in contact with the pin 25, the circuit then being from the armature by the spring 24, frame 26, wire 120, in which case the electromagnet is short-circuited and not energized.

Having described the construction of the portion of my invention which I term the "master" or "initiatory" controlling-clock, I shall now proceed to describe that portion which is attached to the dials for the purpose of enabling the hands to indicate the time at such periods as may be desirable.

In the apparatus to be described the hands are arranged to move so as to indicate the time every thirty seconds. I employ a wheel 72 with one hundred and twenty teeth of any suitable shape, but preferably of ratchet shape, for the purpose of giving half-minute indications, or alternatively a wheel with two hundred and forty teeth for a quarter-of-a-minute indications or sixty teeth for one-minute indications. The said wheel is mounted on a pinion-shaft 73, which has a suitable number of leaves or teeth to gear with a minute-wheel 75, which carries pinion 76, having suitable number of teeth or leaves to work correctly an hour-wheel 77. Through the hour-wheel the shaft or pinion-staff 78 revolves, the said shaft carrying at its end a minute-hand 128, while the hour-wheel is provided with a sleeve or socket 129, carrying the hour-hand 130. The main wheel, with minute and hour wheel, is suitably mounted in or on the frame. The back plate of the frame is attached to the back of the dial and in some cases with a space between the two, in others close up to one another.

An electromagnetic coil 80 is (or coils are) employed, which is supported on the plate 74 by an arm 81, an insulating-strip 82 being interposed between the arm 81 and plate. An armature 83 is hinged in frame 84, said armature being bent and extended upwardly above the level of the great wheel 72 aforesaid. The top end of the armature has a pawl 85 or click working loosely on screw-pin 86. The point 87 of the pawl engages with the teeth of the main wheel 72. A spiral spring 88, secured at one end to frame of clockwork and at the other to the pawl or click, maintains a pull upon the pointed end of the pawl. An arm 89 is pivoted to the armature at its end, the armature end 90 being turned over for the purpose. (See Fig. 9.) This arm is linked to bar 91, which is suspended on a pin 92, set on an arm 93, affixed to frameplate 74ª of the clockwork. The end of the arm 89 has attached a spiral spring 94, secured at its opposite end to rod 95, projected from the frame and arranged to pull back the arm 89 and with it the armature and bar 91, (after the armature has been attracted to the magnet.) The suspended bar 91 projects downwardly below the level of the arm 89 and carries small pins 96 97, which engage with a pawl 98, pivoted or hinged to frame 99. This pawl has flat spring 100 to keep its point in between the teeth of the wheel in which it works, (until the armature, with its suspended bar, is drawn to the magnet, which latter exerts a downward pressure on it.)

101 represents an adjustable screw set in stud 131, projected from frame 74ª, which forms a limiting-stop for pawl 85.

102 is an insulated plate fixed to frame 74, which carries terminals 103 104, which receive the conducting-wires 112 113, which are connected with wires 121 110 from the master-clock.

Referring now to Figs. 6 and 7, which illustrate means for moving the dial-hands independently of the master-clock, 105 represents a press-button to which is attached a wire 132, which passes through a plate 106, constructed of non-conducting material. The press-button is attached to conducting-lever 107, which is fulcrumed to plate 106, and engages with pin 108 to complete the circuit when button 105 is pressed. A spring 109 is provided to return the lever on release of pressure.

The *modus operandi* of the invention is as follows: Assuming the movable parts of the master-clock to be in the position shown in dotted lines, Fig. 1, on the passage of the current the electromagnet will be energized, so as to attract the armature to it, which action will force the arm 50 into the position shown in full lines, Fig. 1, and the pawl 37 will ride over the teeth of the wheel 1. The arm 36 of the lever 34 at the same time falling will cause (through the medium of link 43) the tube 48 to swing on its pivot and cause a movement of the mercury in it. The tube thus immediately becomes the driving-weight of the clock, and as it descends at one end it forces the rod 43 up, thereby acting on the main lever and causing the pawl 37 to turn the toothed wheel 1, the central arm 50 meanwhile descending to the end of the armature, which has, owing to the electrical circuit being broken immediately after action, been returned by spring 20 to its normal position and causing the electrical connection to be again made and the movement repeated. When the arm 50 of the lever is moved up by the force of the electric connection, as before mentioned, it moves back the arm 58, raises the weighted spring 54, and causes the small pawl 57 to ride over, so as to engage with fresh teeth of the wheel 1. The said arms, with the pawl, working in the toothed wheel causes same to be steadied, and thereby stopping the backlash that would be caused by the action of the pallets on the escape-wheel, and the armature will be immediately returned by spring 20 to its normal position, Fig. 1. The spring 61 by means of screw 63 becomes a compensating and maintaining power when pin 60 is driven up by the electric contact to give an extra pressure to lever-arm 35 at the time when the mercury is displaced to the opposite end of the tube; but the spring gradually relaxes its pressure as the arm 35 descends, and the mercury falls as an increasing weight, thereby keeping the pawl 37 at a uniform pressure on wheel 1. The adjusting-screws 30 and 65 are fixed in such a way that the armature may be regulated to strike the lever-arm 50 at any given number of seconds and by which means the connections with the subordinate clocks are controlled to keep time in conjunction with the required number of teeth in the wheel 72 for the periodical indications. As the pendulum swings from side to side the mercury in the curved cylinder is slightly displaced and forms a weight, so as to give an additional impulse to the pendulum. The column of mercury in the straight tube does not flow into the curved tube, but is the compensating column for any variation brought about by atmospheric changes. I may for the purpose of improving the action completely or partially insulate the pendulum from the electric current. As the circuit of the master-clock is completed at intervals as its armature comes in contact with the lever-arm 50, the circuit of the secondary clock or clocks in communication with same will be completed, and the armature 83 will be attracted to the magnet 80 and the pawl 85 be moved forward so as to rotate the wheel 72 to a distance equal to the distance between two teeth, and the parts will move into the position shown in Fig. 10. The circuit now being broken, the armature will be drawn back by the spring 94, and pawl 85 will ride over one tooth of the wheel. At the same time the suspended arm 9 will be drawn back and its bottom end be brought over to and close against the nose of the pawl 98, which latter will be thus held until the armature is again drawn to the magnet or magnets and the movement repeated. The nose of the pawl 85 in its forward movement is met by screw 101, which is adjusted so that only one tooth is taken up, the point of the screw entering the notch in the pawl, thereby preventing the wheel from moving any extra teeth by the surplus force of the armature. As the wheel 72 is thus moved forward to the extent of one tooth, there being (in this case) one hundred and twenty teeth, the hand 128 moves on each impulse one-half minute. The hand cannot be altered until the next action of the armature takes place. The connection between the master or controlling clock and the dials is accomplished by the continuation of the electric current that passes through the master-clock, as aforesaid, and I may employ either the multiple or the series system, with or without duplex wires.

Having now particularly described and ascertained the nature of my said invention and in what manner the same is to be performed, I declare that what I claim is—

1. The combination of a master-clock pendulum, wheel 1, pawl 37, a lever 35 to which the pawl is pivoted, arm 50, arm 36, link 43, a tilting mercury-holder 48, a connection between link 43 and said holder for moving the latter, wires 110, 121, of a clock-circuit, magnet 14 connected between said wires, armature 19, connected in the circuit and extending into the path of arm 50 so as to move it and in contact therewith before the clock-circuit is closed, whereby attraction of the armature moves arm 50, arm 35, pawl 37, arm 36, link 43, and the mercury-holder, a cut-out for the magnet closed by movement of the armature, and means for retracting the armature.

2. The combination of the clock-magnet 14, armature 19 forming a part of the circuit of the magnet, an arm 50 in coöperative relation with said armature, the clock-wheel 1, pawl 37, arm 35 to which the pawl is connected, pivot 33 common to arms 50 and 35, mercury-tube 48, and means connecting pivot 33 with the mercury-tube for tilting it, and a cut-out for the magnet.

3. The combination of arms 35, 36, 50 connected in the form of a T-lever, pivot 33, magnet 14 for a clock-circuit, armature 19 adapted to make and break contact with arm 50 when magnet 14 is energized and deënergized, a cut-out for the magnet, toothed wheel 1, pawl 37 pivotally connected to arm 35, a pivoted click 57 engaging wheel 1, a weight for said click, arm 56, staff 53 supporting arm 56, arm 58 also supported by staff 53, roller 59 carried by arm 58 and bearing against arm 50, arm 54 fixed on the staff 53, and a weight 55 thereon.

4. The combination of magnet 14, armature 19, arms 35, 36, 50 forming a T-lever, a spring 51 carried by arm 50, said arm and the armature being arranged to make and break contact with each other, link 43, the pivoted mercury-tube 48, means connecting said tube and arm 36, adjustable spring 61 operating on arm 35, pawl 37, a spring therefor, stop 39, wheel 1, staff 53, arm 56, pivoted click 57, arm 54, weight 55, and arm 58 also supported on staff 53 and extending to and bearing against said spring 51.

5. The combination of the clock-frame, a stud 33 insulated therefrom, the T-lever 34 having arms 35, 36, 50, spring 51 on the latter arm, magnet 14, armature 19 adapted to make and break contact with arm 50, mercury-tube 40, means connecting said mercury-tube and arm 36 for moving the tube, spring 61 bearing upon arm 35, pawl 37 pivoted to arm 35, wheel 1, stop 39 for the pawl, staff 53, arm 56, arm 54 on said staff, weight 55, arm 58 also connected to said staff and bearing against spring 51, adjustable stops for the armature, a clock-circuit including magnet 14, armature 19 and arm 50, and one or more secondary clocks with controlling-magnets in the same circuit.

6. The combination with a clock-circuit, of a magnet therein, an armature for the magnet, clock-wheel 1, pawl 37, arm 35 supporting the pawl, arm 36, link 43, mercury-tube 48 operated through link 43, arm 50, pivot 33 electrically connected with arm 50, a clock-circuit connected to said pivot, and a sleeve for the pivot connected to the lever, as set forth.

7. The combination of a clock-magnet 14, armature 19, a T-lever 34 having arms 35, 36, 50, the latter arm making and breaking contact with the armature, a mercury-containing tube, a connection between arm 36 and said tube, clock-wheel 1, pawl 37 therefor pivoted to arm 35, a pendulum having a semicircular tube 66, a straight central tube 67 meeting tube 66 at its center but not communicating with tube 66, mercury in both tubes, a pendulum-rod, means for securing the tubes to the pendulum-rod, and an escape mechanism and gear between the pendulum and wheel 1.

8. The combination of a mercury-containing tube elliptical or elongated oval in cross-section, a pivot for the tube, a magnet, an armature therefor, and a lever connected with said tube and which makes and breaks contact with the armature.

9. The combination of a mercury-containing tube elliptical or elongated oval in cross-section and having a globular end, a pivot for the tube out of its center, a magnet, an armature therefor, and a lever connected with said tube and which makes and breaks contact with the armature.

10. The combination of a mercury-containing tube elliptical or elongated oval in cross-section, a pivot for the tube, the pivot being above the tube and slightly farther from the globular end than from the other end, a magnet, an armature therefor, and a lever connected with said tube and which makes and breaks contact with the armature.

Signed at Melbourne, in the Colony of Victoria, Australia, this 20th day of November, 1899.

AUGUSTINE JOHN MADDEN.

Witnesses:
C. W. WADE,
A. HARKER.